Patented July 22, 1952

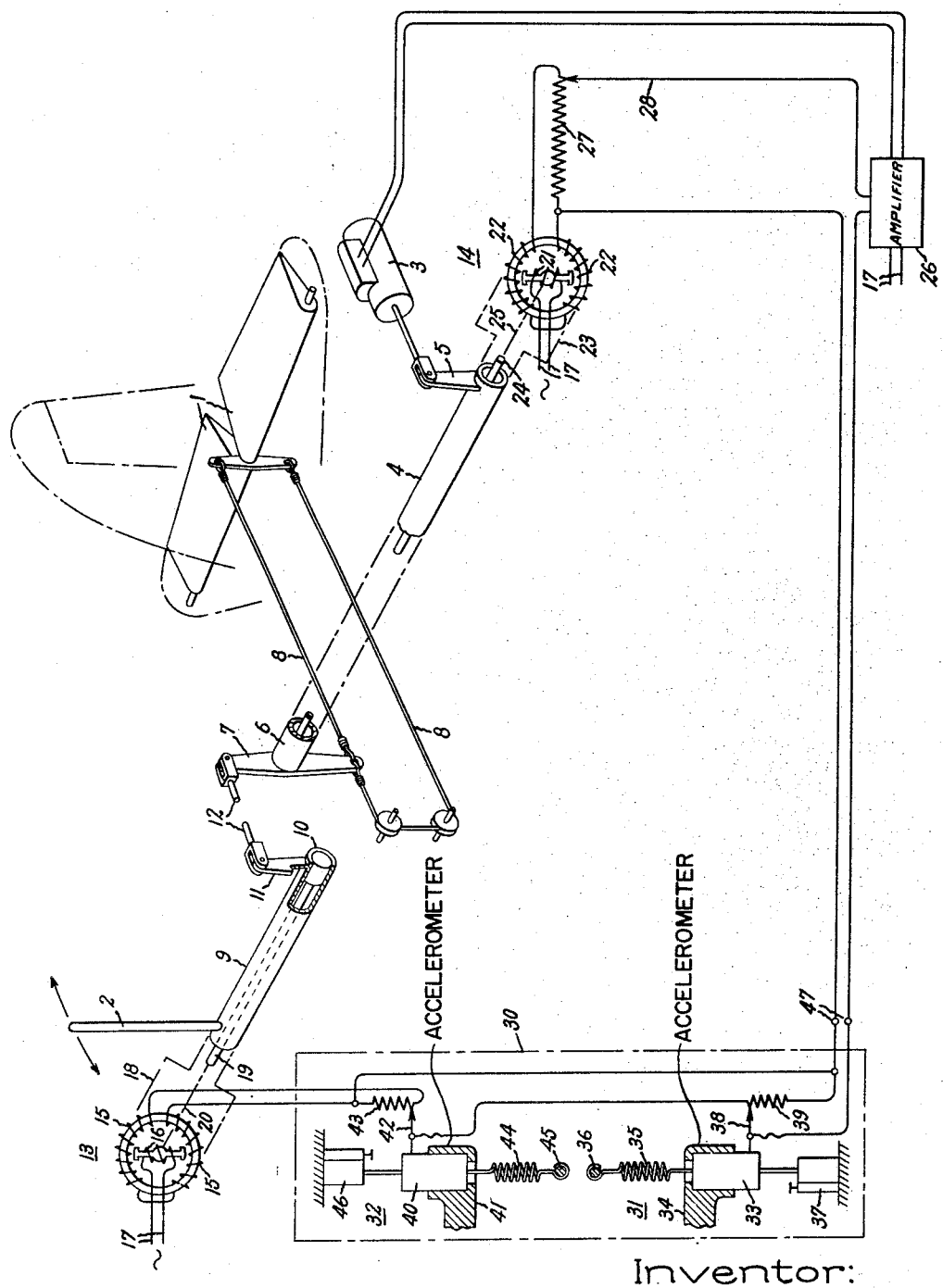

2,604,613

UNITED STATES PATENT OFFICE 2,604,613

POWER BOOST CONTROL SYSTEM

Philip J. Klass, Schenectady, N. Y., assignor to General Electric Company, a corporation of New York Application June 30, 1950, Serial No. 171,408

9 Claims. (Cl. 318—28)

The present invention relates to control systems and more particularly to control systems of the type wherein a controlled object is positioned by a control device with force amplification. It is especially useful in connection with power boost for aircraft and it is this application of my invention which I have elected to illustrate and discuss.

This invention represents an improvement over the system described in Webb Patent 2,451,263 which is also owned by the instant assignee.

Patent 2,451,263 describes a boost system wherein force for the positioning of an aircraft control surface is supplied by both a pilot control lever and a servomotor acting on a common control linkage comprising one or more torque tubes which are deformable. One signal generator, which may be of the selsyn type, is used to measure the strain in the part of the system carrying pilot forces and a second signal generator is used to measure the strain in the power aid or control surface portion of the system. The amplified difference between the two generated voltages, produced as a result of the torque, controls the servomotor and thus the resultant torque appearing at the control surface is the sum of the pilot effort and the servo effort. The ratio of the pilot force to the net force to hold a given control surface position, or the boost ratio is determined by the ratio of the pilot and load generator voltage gradients fed into the amplifier, and thus by means of a potentiometer, boost ratio may be varied by the pilot to operate the controls with extreme ease at large deflection angles. This has the disadvantage that if the boost ratio setting is made to provide sufficient ease of operation of the controls, the aircraft may be put into maneuvers which would greatly overstress its airframe since so very little effort is required of the human pilot and he would not "feel" the approach to conditions of critical stress. Such stress is certainly undesirable in commercial aircraft although there are instances in the case of military aircraft when the pilot must take a calculated risk and temporarily overstress his airplane during combat. Heretofore, there has been no satisfactory means for providing the human pilot with knowledge in a natural form concerning his approach to the critical stress region.

It is therefore an object of the present invention to provide an improved power boost system.

Another object is to provide an electrically-controlled power boost system wherein the amount of boost produced is controlled in accordance with a predetermined condition.

A further object is to provide means for controlling a boost control system as a function of g-load on an airplane.

A still further object of the invention is to provide a power boost control adapted for use with aircraft in which the human pilot may sense or "feel" the approach to the critical stress limit of his aircraft.

According to my invention, I provide a power boost system of the deformable member type in which the degree of boost, and thus the ease of operation, is automatically varied in response to the stress on the controlled object whereby the human pilot will "feel" a sharp decrease in boost (i. e., increased stick force) just ahead of the region of critical stress. In a preferred embodiment, I measure the g-load on the airplane with accelerometers and employ a corresponding signal means to limit or reduce the boost ratio in any desired manner.

The invention will be more fully understood by referring now to the accompanying drawing of a schematic representation of an improved power boost system embodying my invention.

My invention is shown in the drawing as embodied in a power boost system for operating the elevators 1 of an aircraft. Force for the positioning of the elevators 1 during flight is supplied by both a pilot lever 2 and a servomotor 3. The servomotor 3 is coupled to the elevator 1 by means of a torque tube 4 the outer end of which carries an upright bell-crank 5 connected to be operated by the servomotor 3. The inner end of the torque tube 4 is secured to a central solid hub member 6 in any suitable manner as by welding or brazing. The hub 6 has a double ended torque arm 7 projecting therefrom, the lower end of which is connected to a cable 8 which operates the elevators. The hub 6 is free to rotate with respect to the aircraft structure and may be mounted in a suitable bearing (not shown).

The pilot control lever 2 is fastened to the outer end of a separate torque tube 9, the inner end of which is attached to a central hub member 10 in any suitable manner, as by welding or brazing. The hub 10, which is also free to rotate like hub 6, has a torque arm 11 projecting therefrom and the upper end of torque arm 7 is joined to torque arm 11 in any suitable manner such as by a turn buckle rod 12 for example. The connecting member 12 is shown as partly broken away to indicate that the torque tubes may be widely separated so as to be most advantageously located in an aircraft and although the axes of the torque tube are not coincident it will be seen that the torque arm 7 and torque arm 11 will rotate in synchronism. When the pilot lever 2 is moved to the left, the lower end of the bell-crank 7 pivots counterclockwise causing the elevators to be deflected in a downward direction, and when the pilot's lever is moved to the right, the reverse action takes place, this controlling action being entirely conventional and operative even in the absence of a boost system thus providing mechanical standby.

The servomotor 3 is controlled in such a manner that it amplifies the force supplied to the pilot lever 2 so that the pilot need only supply a fractional part of the total force required to operate the elevators 1. In general, this is accomplished by the provision of reversible polarity electric signal generators 13 and 14 which are connected to be actuated in accordance with the elastic deformation occurring in the torque tubes 9 and 4. The signal generators 13 and 14 are connected so that their differential output may be employed to control the direction of movement of the servomotor 3.

The electric signal generator 13 may be a conventional selsyn illustrated schematically as comprising the rotor winding 15 and the stator winding 16. The winding 16 is connected to alternating current supply leads 17. When the rotor winding 15 is in the neutral position shown, the alternating current voltage induced therein from winding 16 is zero. When the rotor 15 is rotated in either direction from the neutral position shown, relative to the stator winding 16, the former produces a net voltage, the magnitude of which varies in accordance with the amount of displacement and the polarity of direction of which varies in accordance with the direction of the displacement from neutral.

In order that the stator and rotor of the signal generator 13 may be relatively displaced in accordance with the elastic deformation occurring in the torque tube 9, the rotor 15 is mechanically connected to the outer end of the torque tube in any suitable manner, this connection being schematically indicated by the dash line 18. The stator 16 of the signal generator 13 is maintained at a reference or datum position by connecting it to an outer end of a rod 19 this connection being schematically indicated by the dash line 20. As will be noted from an inspection of the drawing, the rod 19 is located within the hollow torque tube 9, the inner end of the rod being attached to or forming part of the central hub member 10. Thus, whenever force is transmitted between the pilot control lever 2 and the elevators 1 through the linkage including the torque tube 9, the elastic deformation or twist of the torque tube will cause a corresponding rotation between the rotor and stator of the signal generator 13 and the voltage output of the signal generator will indicate by its magnitude and polarity the amount and direction of the elastic deformation of the torque tube 9.

The electric signal generator 14 is similar to the previously described signal generator 13 and has a stator winding 21 and a rotor winding 22. The stator winding 21 is connected to the common alternating current supply leads 17.

In order that the electric signal generator 14 may be actuated in accordance with the elastic deformation occurring in the torque tube 4, the rotor 22 is mechanically connected to the outer end of the torque tube 4 by any suitable means schematically indicated by the dash line 23. For the purpose of maintaining the stator member 21 at a reference or datum position, it is connected to the outer end of a rod 24, this connection being schematically indicated by the dash line 25. The rod 24 lies within the hollow torque tube 4, the inner end of the rod being connected to or forming a part of the central hub member 6. With this arrangement it will be clear that whenever forces transmitted by the torque tube 4 between the servomotor bell crank 5 and the elevator 1, the elastic deformation of the torque tube 4 will cause a corresponding relative rotation of the rotor and stator members of the electric signal generator 14, the magnitude and polarity of the output voltage of the signal generator being indicative of the amount and direction of the elastic deformation or twist of the torque tube 4.

The thickness and composition of the torque tubes 9 and 4 are selected such that the elastic deformations therein are suitable for operation of the signal generators 13 and 14. For proper operation, the torque tube should be designed so that the elastic limit of the material is not exceeded under conditions of maximum stress encountered in operation.

In order that the output of the signal generators 13 and 14 may be utilized to control the direction of movement of the servomotor 3, they are effectively connected in opposing series circuit relation to the input of a polarity or phase sensitive amplifier rectifier 26. The amplifier, which is energized from the common alternating supply lead 17, supplies a normally balanced direct current output to the servomotor 3 in a direction dependent upon the polarity of the amplifier input signal.

In order to adjust the boost amplification of the system, means are inserted for varying the relative outputs of signal generators 13 and 14. For this purpose, I have employed a voltage gradient adjusting potentiometer 27 which is connected across the output of rotor winding 22 and has a wiper arm 28. From the manner in which the output of signal generator 14 is connected, it will be evident that by moving the arm 28 from the right to the left, something less than the full voltage generated by generator 14 will be tapped off for transmission to the amplifier, or in other words, the amplifier will receive a relatively larger signal from the pilot signal generator 13 and therefore, greater force amplification will result.

With the foregoing arrangement, it will be clear that the boost ratio may be made as high as desired so that the controls will operate easily at any airplane deflection angle. As pointed out earlier however, there is the disadvantage in that, with a high boost ratio, an airplane may be unwittingly subjected to maneuvers which will overstress the airframe. According to the present invention, I provide means for overcoming such a disadvantage by having the boost ratio vary as some function, such as g-load in order that the boost ratio will decrease sharply as the region of critical stress is approached thereby warning the human pilot.

Looking again at the drawing, my invention will be seen to comprise a limiting means 30 for modifying the boost ratio of my system in accordance with the deflection of one or more accelerometers. In order to obtain a measure of both positive and negative g-loads, two accelerometers are utilized, these being indicated generally as 31 and 32 respectively. Accelerometers per se are well known in the art and are therefore merely represented schematically.

Accelerometer 31 comprises a weight 33 which is free to travel within guide member 34. The weight 33 is suspended by a spring 35 from a fixed support 36. A dash pot 37 is provided to suitably dampen the movement of the weight. Fixed to move with the weight 33 is a wiper arm 38 which travels along a resistance 39. Under conditions of zero acceleration the weight is positioned against the upper shoulder stops of the guides 34 in which position the arm 38 is at the top of resistor 39.

Accelerometer 32 comprises essentially the same elements as accelerometer 31 except that it is adapted to measure negative g-loads. Weight 40 is adapted to move within guide member 41, and to this weight there is fixed a wiper arm 42 which is connected to travel along resistor 43. Accelerations tending to raise the weight 40 will do so against the spring 44 which is attached to a fixed point 45. Again, a dash pot 46 is employed to dampen movement of the weight 40.

As shown in the drawing, resistors 39 and 43 are connected in parallel with the rotor 15 of selsyn 13. It will be clear that due to shoulder stops on guide members 34 and 41, only one of the accelerometer weights will move from its position of rest at any one time depending on whether acceleration is positive or negative. Accordingly, only one of the two wiper arms 39, 42 will act at any one time to reduce the amount of voltage generated by the selsyn 13. Any reduction will appear at the output terminals 47 and thus, for a given setting of the boost ratio arm 28, the amplifier 26 will receive a relatively smaller signal with either positive or negative increases in g-loads, thus reducing the boost capabilities of the system and requiring the human pilot to exert more force to actuate his control lever 2.

With the foregoing understanding of the elements and their organization, the operation of my improved power boost system will be readily understood from the following explanation. It will be assumed that initially, the signal generators 13 and 14 are in the zero voltage position and the potentiometer arm 28 is at the extreme right position. For this condition, the voltage input to the amplifier 26 will be zero and the servomotor 3 will be stationary. It will also be assumed that the aircraft is not turning about the pitch axis and that the elevators 1 are in a neutral position. If the pilot desires to depress the elevators 1 so as to place the aircraft in a dive, he pushes on the top of the control lever 2 in a direction tending to rotate it to the left as viewed in the drawing. This action causes an elastic deformation of the torque tube 9 whereby the signal generator 13 produces a control voltage which is applied to the input of amplifier 26, resulting in a displacement of the servomotor 3 in a direction to aid the pilot in moving the lever 2. As a result of this action, the bell-crank 7 rotates to depress the elevators 1 and the aircraft begins to dive. In diving the aircraft, a negative g-load will be imposed upon its airframe, and depending upon the amount of acceleration, the arm 42 of accelerometer 32 will begin to travel across resistance 43 in a direction to reduce the amount of voltage generated by the selsyn 13. This in turn will reduce the pilot selsyn voltage output with respect to the load selsyn voltage output, thus requiring greater exertion to be applied to control lever 2 by the human pilot. He will then begin to feel more of the control surface forces. If the human pilot continues to press his aircraft into a still steeper dive, the weight 40 will move the arm 42 still further along resistor 43 further decreasing the output at terminals 47, and thus it will be seen that with a progressive increase in negative g-load, the pilot will become increasingly conscious of the increased forces on the control surface and he will thus be able to sense more and more, the strain being placed on his control lever and therefore on his aircraft.

By tapering the resistor 43, it will be clear that any desired decrease of boost as a function of g-load may be incorporated into the system. For commercial aircraft, it would be desirable to actually limit the permissible boost, whereas in military aircraft, it should be preferable to sharply decrease the amount of boost upon approach to the critical stress region so as to give the human pilot a definite warning by increasing the load on his control lever but yet permit him to take a calculated risk under emergency conditions. It will be clear of course that the boost ratio may be adjusted manually by the arm 28 so that if necessary, a pilot may alter the degree of feel without losing the characteristic change in feel upon approach to the critical stress region.

Due to the action of the air stream, the elevators tend to resist movement away from the flight neutral position, and when they are moved by the action of the servomotor 3 and the control lever 2, there is a reactive force which causes an elastic deformation or twist of the torque tube 4 proportional to the force exerted on the elevators. This elastic deformation of the torque tube 4 causes actuation of the signal generator 14 which produces a control voltage in opposition to that produced by the signal generator 13. When the elevators are depressed to a point where the voltage produced by the signal generator 13 as modified by limiting means 30 is equal and opposite to that produced by the signal generator 14, the input voltage to the amplifier 26 becomes zero and movement of the servomotor 3 ceases.

If the pilot now desires to restore the elevators to the neutral position, he simply releases the control lever 2. Due to its elasticity and the pressure of the airstream on the elevators the torque tube 9 then returns to its initial position in which the voltage output of the signal generator 13 is zero. A signal voltage of reverse polarity is then applied to the input of the amplifier 26 by the signal generator 14 whereupon the servomotor 3 moves in the opposite direction, moving the elevators 1 toward the neutral position. When the elevators reach the neutral position, there is no longer any reactive force exerted on the torque tube 4 which then, because of its elasticity, returns to its neutral unstressed position whereupon the voltage output of the signal generator 14 returns to zero and the servomotor stops.

From the foregoing it will be clear that when the pilot control lever is displaced in the opposite direction, the reverse action takes place and the elevators 1 are raised until the reactive force thereon is proportional to the force exerted on the control lever 2. Similarly when the control lever is released, the servomotor 3 causes the elevators and the control lever 2 to be restored to the center neutral position.

If, in pulling out of a dive, a positive g-load is imposed upon the aircraft, accelerometer 31 will start to function but the weight 40 of accelerometer 32 will remain in its seated position against the shoulders of the guide members 41. The operation of accelerometer 31 is similar to that of accelerometer 32 except that the voltage output of selsyn 13 is reduced upon the imposition of positive g-loads instead of negative g-loads. In a well known manner, accelerometer natural frequency and damping ratio may be judiciously chosen to prevent accelerometer response to transient accelerations or vibrations of the airframe.

During periods of extreme turbulence, there is a tendency for the pilot to "over-control" the airplane, thereby magnifying the adverse effects of the turbulence. The natural frequency and damping ratio might be so chosen to permit the accelerometer to respond to vertical accelerations in turbulent flight, thereby permitting boost reduction and reducing the tendency of the human pilot to over-control the airplane.

It will be obvious that specific stress at any point in the airframe can be measured by a variety of conventional instruments and if desired these may be substituted for the limiting means 30 to limit severe stress or warn the pilot upon approach to critical stress conditions in the manner above described. In this manner, the boost ratio may be varied as a function of air speed, angle of attack and rate of climb for example. It should be understood therefore that the invention is not limited to the particular arrangement disclosed but that the appended claims are intended to cover all modifications which do not depart from the true spirit and scope of my invention.

What I claim is:

1. In a control system for actuating a controlled object by a control device with force amplification, first and second elastic linkages, a connection joining one end of each of said linkages to one end of the other, said control device being attached to the other end of said first linkage and said controlled object being attached for movement with said connection, servo means coupled to the other end of said second linkage for supplementing the control force applied by said control device, a first electric signal generator connected to respond to elastic deformation of said first linkage, a second electric signal generator connected to respond to elastic deformation of said second linkage, acceleration responsive means for limiting the output of said first signal generator and electro-responsive means responsive to the difference between the outputs of said second signal generator and the output of said acceleration responsive means for controlling said servomotor.

2. A control system having a servomotor for actuating a load comprising, an elastic linkage interconnecting said servomotor with a load to be actuated, a control device, means responsive to movement of said control device for producing a first control signal voltage, means responsive to deformation of said elastic linkage for producing a second control signal voltage, limiting means connected to vary one of said signal voltages as a function of acceleration to produce a modified signal voltage output, means for algebraically adding said modified signal voltage output with the remaining unmodified signal voltage output to produce a resultant voltage, and means for controlling said servomotor in accordance with said resultant voltage.

3. In a power boost system having servo means for assisting in the actuation of a controlled object, a force transmitting member for actuating said controlled object, an elastic linkage interconnecting said controlled object and said servomotor, means responsive to elastic formation of said force transmitting member for causing said servomotor to move in a direction to assist movement of said force transmitting member, and means responsive to acceleration for limiting the assisting force delivered to the servomotor.

4. In a power boost control system having a reversible servomotor, a control device and a controlled object, a first mechanical linkage interconnecting said control device and said controlled object, a second mechanical linkage interconnecting said controlled object and said servomotor, said first linkage being subject to elastic deformation when a force is applied to said control device and said second linkage being subject to elastic deformation when said servomotor applies a force to said controlled object, means for providing a first E. M. F. varying in magnitude and polarity in accordance with the amount and direction of elastic deformation in said first linkage, means for providing a second E. M. F. varying in magnitude and polarity with the amount and direction of elastic deformation in said second linkage, acceleration responsive means for varying the magnitude of one E. M. F., and means for controlling the movement of said servomotor in accordance with the algebraic sum of the varied E. M. F. and the non-varied E. M. F.

5. In a power boost system, first and second torque tubes each having one end interconnected, a rotatable control lever connected to the other end of said first tube, a rotatable controlled object connected to the junction of said torque tubes, and providing resistance against rotation in either direction from a neutral position, a reversible servomotor connected to the other end of said second tube to apply torque thereto, a first signal generator responsive to elastic deformation of said first torque tube for producing a signal voltage variable in polarity and magnitude in accordance with the direction and amount of deformation a second signal generator responsive to elastic deformation of said second torque tube for producing a signal voltage variable in polarity and magnitude in accordance with the direction and amount of deformation, means responsive to the g-load on said controlled object for modifying the output voltage of said first generator, and electro-responsive means controlled jointly by said first-mentioned signal voltage and said modified output voltage for controlling the movement of said servomotor.

6. In a power boost control system, a control device, a controlled object, a first mechanical linkage coupling said controlled object to said control device said linkage being subject to elastic deformation when force is transmitted thereby between said controlled device and said controlled object, a second mechanical linkage coupled to said controlled object, power boost means for assisting the actuation of said controlled object by said control device, said power boost means comprising a servomotor coupled to said second linkage, means for measuring the respective direction and amounts of elastic deformation of said mechanical linkages, means for converting said measured deformation into first and second electrical signals, the magnitude and direction of which varies in accordance with the amount and direction of the measured deformation, means actuated by an accelerometer for modifying the relative magnitude of said first electric signal, and means for controlling the direction and movement of said servomotor in accordance with the algebraic sum of said modified first electric signal and said second signal.

7. In a control system for actuating a controlled object with force amplification, a pair of elastic linkages having a coupling therebetween for connection to said controlled object, one end of the coupled linkage being adapted for elastic deformation by a control device, a servomotor connected to the other end of said coupled linkage for supplementing the control force applied by said control device, a first electric signal generator connected to respond to elastic deformation of one linkage, a second electric signal generator connected to respond to elastic deformation of the other linkage, stress responsive means for varying the voltage gradient of one of said generators to adjust the amplification factor, and an amplifier between the varying means and said servomotor.

8. A control system for actuating a load in accordance with movement of a control device comprising, a servomotor, a first mechanical connection for transmitting operation force between said control device and said load, said connection being subject to elastic deformation when force is applied thereto, an electric generator actuated by said control device for producing a first reversible direct control voltage, a second mechanical connection for transmitting operating force between said servomotor and said load, said connection being subject to elastic deformation when force is applied thereto, an electric signal generator actuated in accordance with the elastic deformation of said mechanical connection for producing a second reversible direct control voltage, resistance means for modifying the voltage gradient of one of said generators as a function of acceleration of said load, and a direction-sensitive electro-responsive device connected to be responsive to the resultant of the modified voltage gradient of one control voltage and the voltage from the unmodified control voltage.

9. A control system for actuating a load in accordance with movement of a control device comprising, a servomotor, a mechanical connection for transmitting operating force between said servomotor and said load, said connection being subject to elastic deformation when force is applied thereto, an electric signal generator actuated by said control device for producing a first reversible polarity control voltage, an electric signal generator actuated in accordance with the elastic deformation of said mechanical connection for producing a second reversible polarity control voltage, an electro-responsive device responsive to the combined outputs of said signal generators for controlling said servomotor, and acceleration measuring means for adjusting the voltage gradient of one of said signal generators.

PHILIP J. KLASS.

REFERENCES CITED

The following references are of record in the file of this patent:

UNITED STATES PATENTS

| Number | Name | Date |
|---|---|---|
| 2,092,424 | Potez | Sept. 7, 1937 |
| 2,451,263 | Webb | Oct. 12, 1948 |

FOREIGN PATENTS

| Number | Country | Date |
|---|---|---|
| 838,413 | France | Mar. 6, 1939 |
| 826,649 | France | Mar. 11, 1941 |